(12) United States Patent
Hager (10) Patent No.: US 7,036,521 B2
(45) Date of Patent: May 2, 2006

(54) AIR CONSERVING SLIDE VALVE

(75) Inventor: Charles B. Hager, Davenport, IA (US)

(73) Assignee: Carleton Life Support Systems, Inc., Orchard Park, NY (US)

( * ) Notice: Subject to any disclaimer, the term of this patent is extended or adjusted under 35 U.S.C. 154(b) by 337 days.

(21) Appl. No.: 10/250,243

(22) Filed: Jun. 17, 2003

(65) Prior Publication Data
US 2004/0211476 A1    Oct. 28, 2004

Related U.S. Application Data

(60) Provisional application No. 60/320,149, filed on Apr. 27, 2003.

(51) Int. Cl.
*F16K 11/06* (2006.01)

(52) U.S. Cl. .................... 137/309; 96/130; 137/625.43

(58) Field of Classification Search ................ 137/309, 137/625.25, 625.43; 96/130
See application file for complete search history.

(56) References Cited

U.S. PATENT DOCUMENTS

| | | | |
|---|---|---|---|
| 1,849,242 A * | 3/1932 | Moll ........................... | 137/309 |
| 3,703,068 A | 11/1972 | Wagner ........................ | 95/11 |
| 3,922,149 A | 11/1975 | Ruder et al. .................. | 95/96 |
| 4,197,095 A | 4/1980 | White, Jr. et al. ............ | 96/130 |
| 4,349,357 A | 9/1982 | Russell ........................ | 95/130 |
| 4,404,005 A | 9/1983 | Hamlin et al. ................ | 96/111 |
| 4,449,990 A | 5/1984 | Tedford, Jr. .................. | 95/102 |
| 4,472,177 A | 9/1984 | Sircar ........................... | 95/11 |
| 4,516,424 A | 5/1985 | Rowland ........................ | 95/11 |
| 4,543,109 A | 9/1985 | Hamlin et al. .................. | 95/98 |
| 4,561,287 A | 12/1985 | Rowland ........................ | 95/11 |
| 4,567,909 A | 2/1986 | Schebler et al. ............ | 137/81.1 |
| 4,627,860 A | 12/1986 | Rowland ...................... | 96/111 |
| 4,631,073 A | 12/1986 | Null et al. ...................... | 95/8 |

(Continued)

FOREIGN PATENT DOCUMENTS

EP    0129304    1/1984

OTHER PUBLICATIONS

Haigh, "A New Concept in Life Support Systems, The NGL Molecular Sieve Oxygen Generator"; Aircraft Engineering, vol. 52, No. 1, Jan. 1982, pp. 8-12.

*Primary Examiner*—John Rivell
(74) *Attorney, Agent, or Firm*—Marsteller & Associates, P.C.

(57) ABSTRACT

A slide type valve (V) for regulating a gas generating system (10) that has at least a first and a second gas concentrating bed unit (12, 14) includes an outer body (120) with a slide face (106) having at least three open ports (130, 132, 134) communicating with an interior cavity (136) formed in the outer body (120). A vent port (132) and at least two bed ports (130, 134) are adapted to communicate an air flow with a gas concentrating bed unit (12, 14). The vent port (132) is formed between two bed ports. A slide block (100) having an essentially flat face (146) slides along the slide face interior surface (142) of the outer body (12) and has an interior cavity (148) and a first and a second opening (150, 152). The slide block slide face (146) has a closing portion (104) positioned between the first and second openings (150, 152). A controller (C) moves the slide block (100) between a first state (S1) and a second state (S2) for desired air flow.

10 Claims, 6 Drawing Sheets

U.S. PATENT DOCUMENTS

| | | | |
|---|---|---|---|
| 4,648,888 A | 3/1987 | Rowland | 95/8 |
| 4,661,124 A | 4/1987 | Hamlin et al. | 55/21 |
| 4,687,013 A | 8/1987 | Stevenson | 96/111 |
| 4,693,730 A | 9/1987 | Miller et al. | 95/8 |
| 4,783,205 A | 11/1988 | Searle | 96/111 |
| 4,822,384 A | 4/1989 | Kato et al. | 96/111 |
| 4,927,434 A | 5/1990 | Cordes et al. | 95/96 |
| 5,004,485 A | 4/1991 | Hamlin et al. | 55/160 |
| 5,071,453 A | 12/1991 | Hradek et al. | 55/21 |
| 5,154,737 A | 10/1992 | Jenkins et al. | 95/11 |
| 5,258,056 A | 11/1993 | Shirley et al. | 95/97 |
| 5,340,381 A | 8/1994 | Vorih | 95/105 |
| 5,407,465 A | 4/1995 | Schaub et al. | 95/105 |
| 5,474,595 A | 12/1995 | McCombs | 95/96 |
| 5,486,226 A | 1/1996 | Ross et al. | 95/11 |
| 5,529,607 A | 6/1996 | Tan | 95/105 |
| 5,531,807 A | 7/1996 | McCombs | 95/96 |
| 5,593,478 A | 1/1997 | Hill et al. | 96/111 |
| 5,656,065 A | 8/1997 | Kalbassi et al. | 95/96 |
| 5,711,787 A | 1/1998 | Neill et al. | 95/96 |
| 5,733,359 A | 3/1998 | Doong | 95/8 |
| 5,746,806 A | 5/1998 | Aylsworth et al. | 95/8 |
| 5,858,063 A | 1/1999 | Cao et al. | 95/11 |
| 6,063,169 A * | 5/2000 | Cramer et al. | 96/112 |
| 6,077,331 A | 6/2000 | Phillips | 95/12 |
| 6,170,524 B1 * | 1/2001 | Gray, Jr. | 137/625.18 |
| 6,383,256 B1 | 5/2002 | Phillips | 95/12 |

\* cited by examiner

FIG. 5

AIR CONSERVING SLIDE VALVE

CROSS REFERENCE TO RELATED APPLICATIONS

This application claims the benefit of U.S. Provisional Application Ser. No. 60/320149, filed Apr. 27, 2003, entitled AIR CONSERVING SLIDE VALVE.

BACKGROUND OF INVENTION

1. Technical Field

The invention relates to the field of gas generators, and more particularly to a pressure swing adsorption apparatus.

2. Background Art

On Board Inert Gas Generating Systems (OBIGGS), or On Board Oxygen Generating Systems (OBOGS) utilize molecular sieve by employing a pressure swing adsorption (PSA) process that have been used for many years to generate either Nitrogen or Oxygen product gas respectively. This known PSA technology uses compressed air or conditioned engine bleed air fed through a valve or valves to pressurize molecular sieve contained in one of a number of canisters. After a predetermined period of time, the valve changes state, venting the one canister full of sieve, then pressurizing the next canister. This process of pressurization and venting is the PSA process. Previous PSA systems have been controlled by a rotary valve, driven by a fixed or variable speed motor. Still others utilize a system of dedicated independent valves to control each pressurization and each venting cycle for each canister or bed.

Known PSA systems have utilized a linear 4-way slide valve, which connects input air port with the first canister, while connecting a vent port with the second canister. The valve changes state, which connects the vent port with the first canister and simultaneously connecting the second canister with the input air. The linear 4-way slide valve simplifies the complex system of independent dedicated valves necessary on some systems. The linear valve has also proven to be more reliable then either the rotary valve or the system of valves, accomplishing the same tasks.

The linear valve used on typical PSA systems is pneumatically operated. Miniature pilot solenoid valves that are opened and closed using solid state electronics, housed in an EMI shielded enclosure control pilot gas. The pilot solenoids provide gas pressure to two gas cylinders, which are connected to a sliding block. The block slides across a mating plate with three openings or ports. The ports are constructed in a straight line. The outer ports are equal-distance from center port. The sliding block has an undercut, which acts as a flow path. The flow path is sized to connect two of the three ports at any one point in time. A controller is set to open and close the miniature pilot valves at a predetermined time.

The use of a system of valves in a sequencing scheme to conserve compressed air has been explored in a shipboard nitrogen system. By using venting gas to start the pressurization of the sequential canister, new air could be saved. This "reusing" of compressed air in a finite air source PSA system demonstrated that the overall efficiency of the system could be improved, providing a series of options for reducing compressor size, reducing system size, or providing higher product output.

In some applications, the source of new air is limited. Many airborne and ground based systems have a finite source of air. There are many uses for bleed air on rotary and fixed wing aircraft, hence conserving the available air is critical. There have been a number of studies conducted for various concepts for air conservation. A number of these studies have resulted in patents, such as U.S. Pat. Nos. 5,858,063, 6,409,807, and 5,074893.

The drawback to known systems is that they generally depend on high number of independent two-way and three-way solenoid valves to perform the air conservation process or principles. The present invention utilizes a highly reliable slide valve device, which normally operates like a four-way valve. In the present invention, the device provides a new communication path for airflow, which produces the desired air reuse, or conservation, without the unnecessary complication of numerous valves. The reduction of parts and improving air use results in a reduction in weight which is critical to airborne applications of either oxygen or nitrogen systems.

While the above cited references introduce and disclose a number of noteworthy advances and technological improvements within the art, none completely fulfills the specific objectives achieved by this invention.

SUMMARY OF INVENTION

In accordance with the present invention, a slide type valve for regulating a gas generating system that has at least a first and a second gas concentrating bed unit includes an outer body with a slide face having at least three open ports communicating with an interior cavity formed in the outer body. The slide face has an exterior surface and an essentially flat interior surface. The open ports form a vent port and at least two bed ports each of which is adapted to communicate an air flow with a gas concentrating bed unit. The vent port is formed between two bed ports. A feed air port in the outer body is adapted for communicating feed air into the interior cavity of the outer body. A slide block having an essentially flat face suitable for sliding along the interior surface of the slide face of the outer body has a hollow interior cavity and a first and a second opening formed through the flat face compatible with the open ports of the outer body. The slide face of the slide block has a closing portion position between the first and second openings. A controller moves the slide block between a first state and a second state for desired air flow between the gas concentrating bed units, feed air port, and the vent port.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

The present invention discloses the device that performs air conservation techniques by reducing the number of valves used from 4 or more discrete valves to one valve. The inherent reliability of the system is improved; the overall weight of the system 10 is reduced; and, the principles of air conservation, by reusing waste gas from a PSA system 10, are efficiently put into practice. The device also maintains the ability for air conservation, independent of wear, due to the mechanical relation of the single slide block integral to the slide valve. Other systems, relying on numerous valves, will have a tendency to wear, and likely to change states at different times, reducing the efficiency of the air conservation system.

The PSA process works by simply providing a source of clean dry air to a set of sieve filled canisters 11, 12, 13, 14. By alternately pressurizing one canister, and venting the second canister, the PSA process adsorbs the waste gas, allowing product to pass. At a predetermined time interval, the once pressurized canister is vented while the once vented canister is pressurized. Since the process is primarily mechanical, the process is reversible and will produce an infinite of product, either oxygen or nitrogen as long as the system control is operational, and the source of pressurized air is available.

Figure 1:
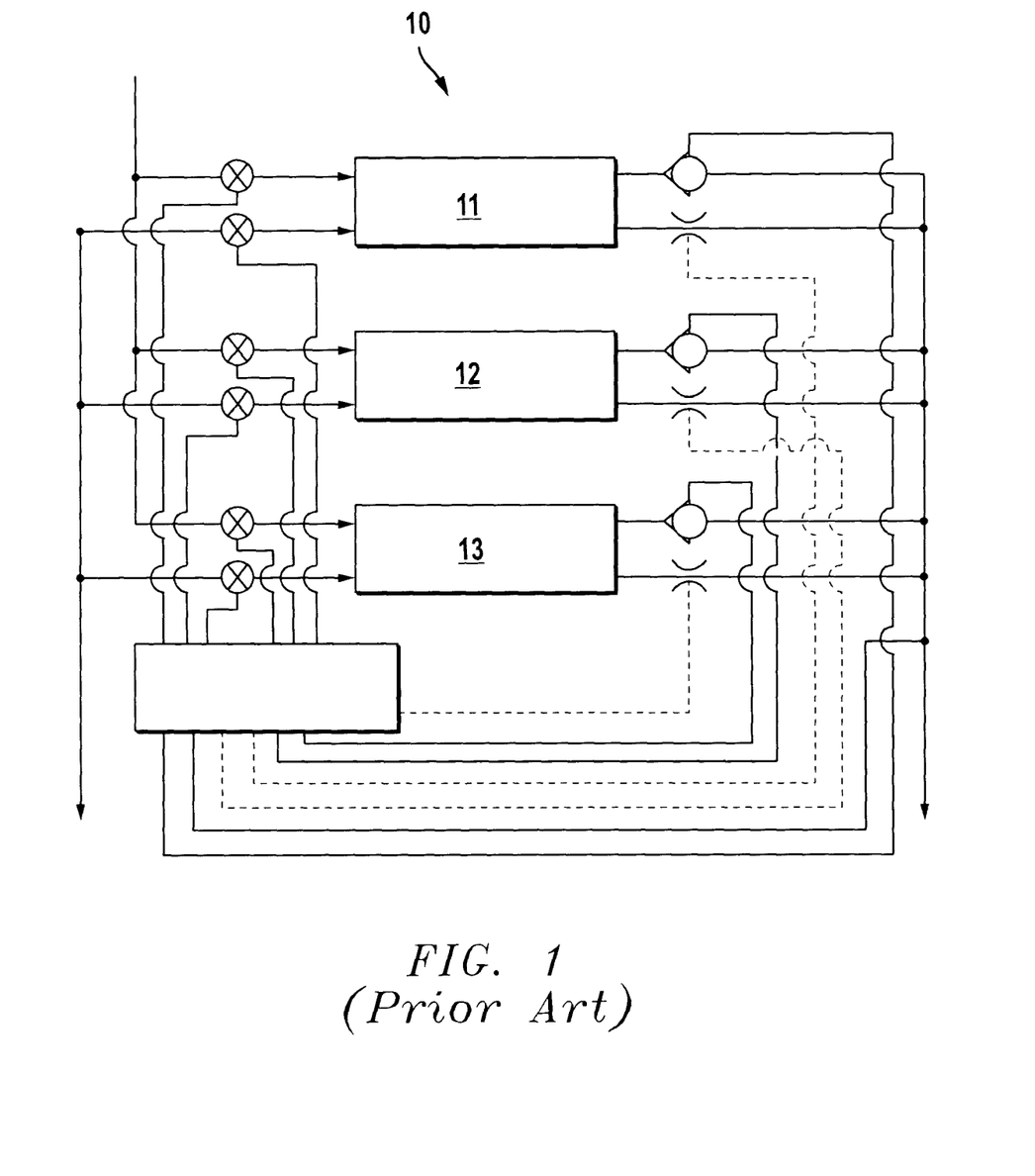
FIG. 1 is an illustrative view of a known gas separation apparatus.

As previously disclosed in U.S. Pat. No. 5,074,893 and shown in FIG. 1, it is possible with a number of valves to selectively use the vent gas to pre-pressurize the sequentially pressurized bed. By using "waste" gas in this manner, it effectively saves new air from being used. At a predetermined interval the pre-pressurization is stopped, the remaining waste gas is allowed to vent external to the system 10, and new air is used to complete the pressurization and gas separation. The pre-pressurization can then be performed during the next vent/pressurization cycle, as a method of air conservation.

Figure 2:
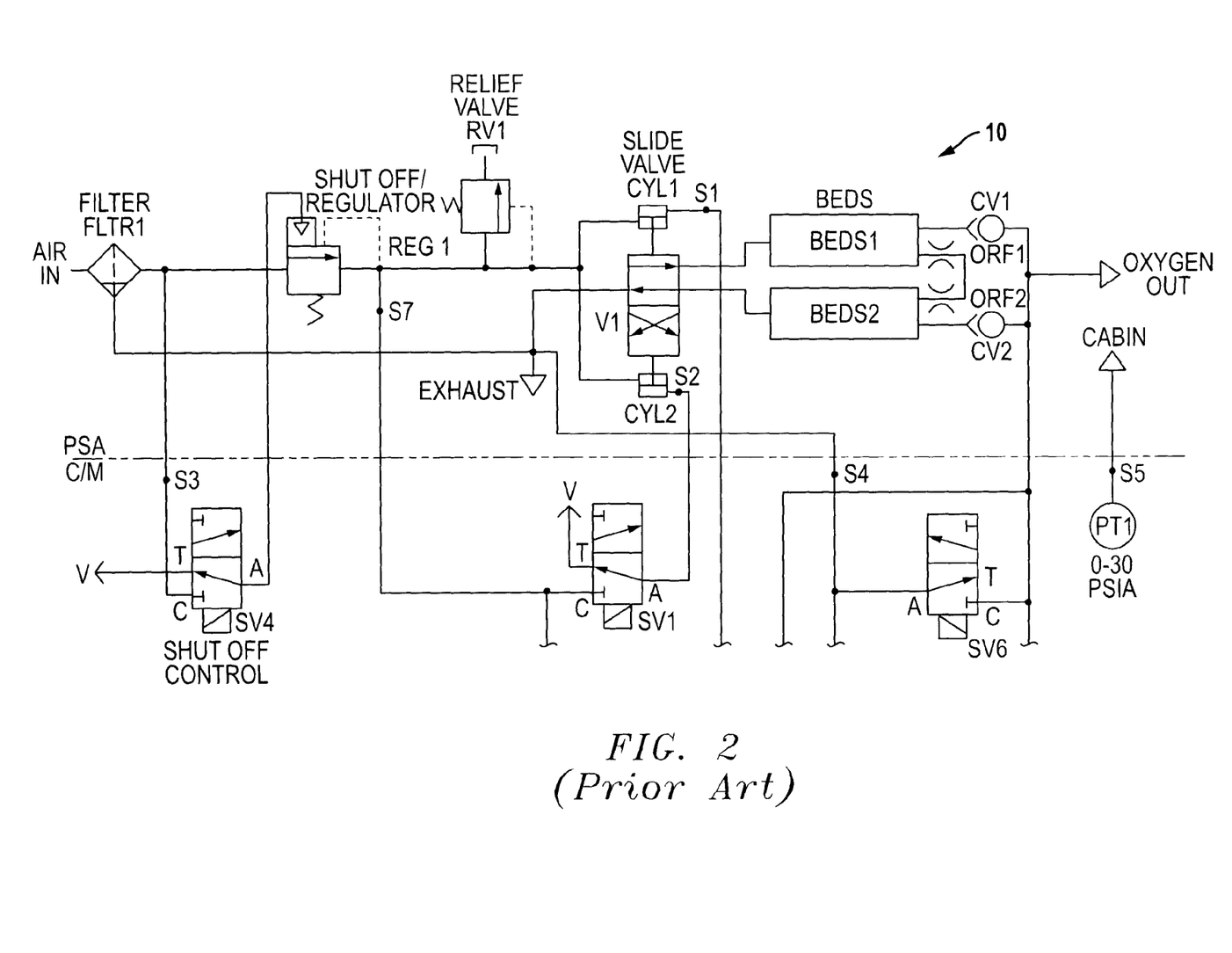
FIG. 2 is a pneumatic schematic of a known PSA concentrator subsystem and controller/monitor.

FIG. 2 discloses a known PSA system 10 using a 4-way slide valve. In the first state, the valve directs feed air to bed 1, while directing waste gas external to the system. When the valve changes state, the waste gas in bed 1 is directed external to the system, and bed 2 receives the feed air.

Figure 3:
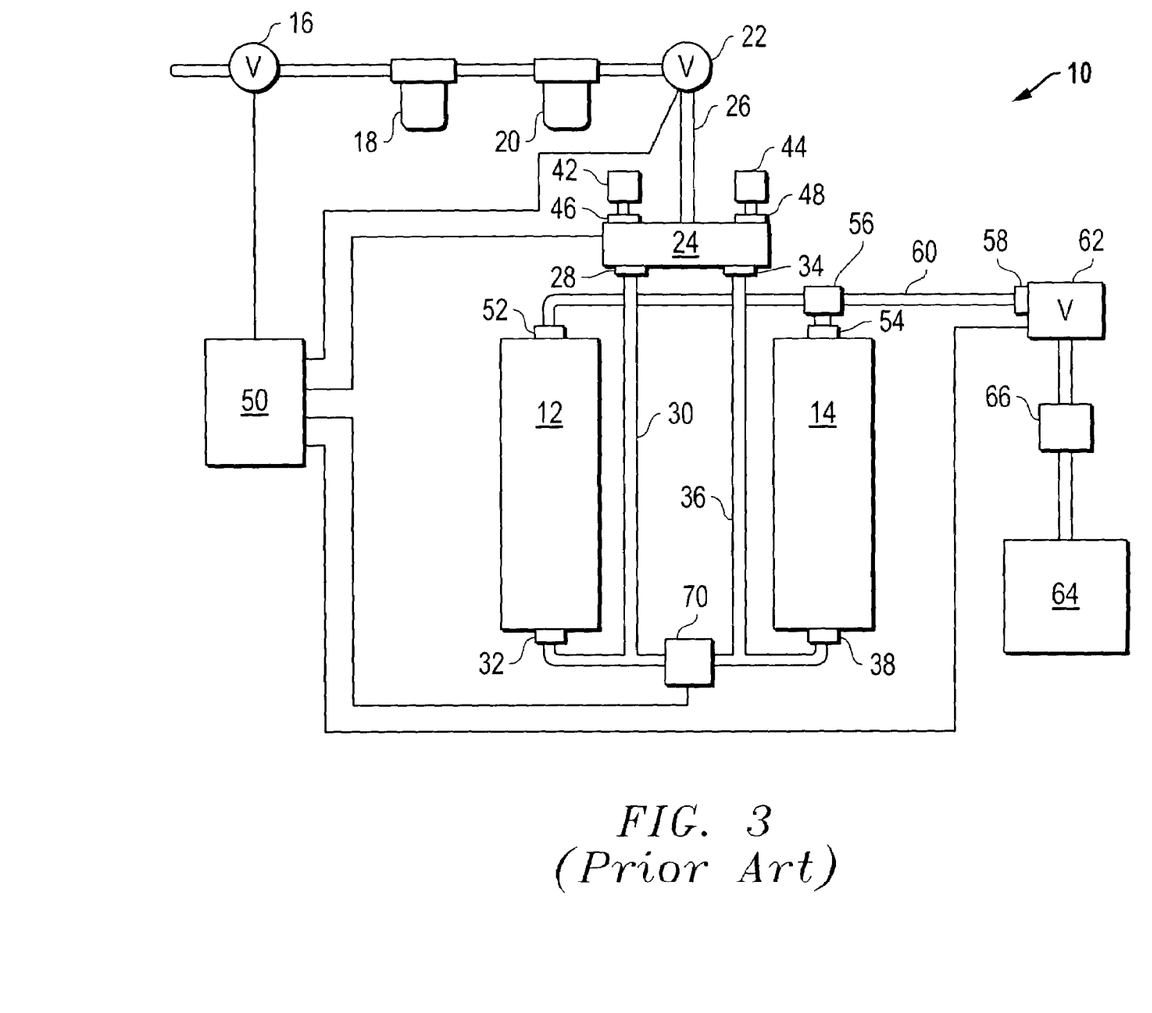
FIG. 3 is a schematic view of a known two bed adsorption system for producing oxygen and includes a waste saving crossover arrangement.

FIG. 3 teaches a known PSA system 10 using a series of independent valves, either two-way or three way valves, to perform air conservation. A number of the valves are used to perform the normal pressurization and venting for the PSA system. An additional set of valves are used to perform the pre-pressurization function. The present invention eliminates a number of the independent valves by combining certain two-way and three way valves. This invention eliminates all the additional valves taught in U.S. Pat. No. 5,074,893, Fluid Adsorption System, and U.S. Pat. No. 6,077,331, Molecular Sieve Type Gas Separation Apparatus and Method, by way of exemplary prior teachings, and accomplishes air conservation with two highly reliable solenoid valves or similar functioning motors, and one linear slide.

Figure 4A:
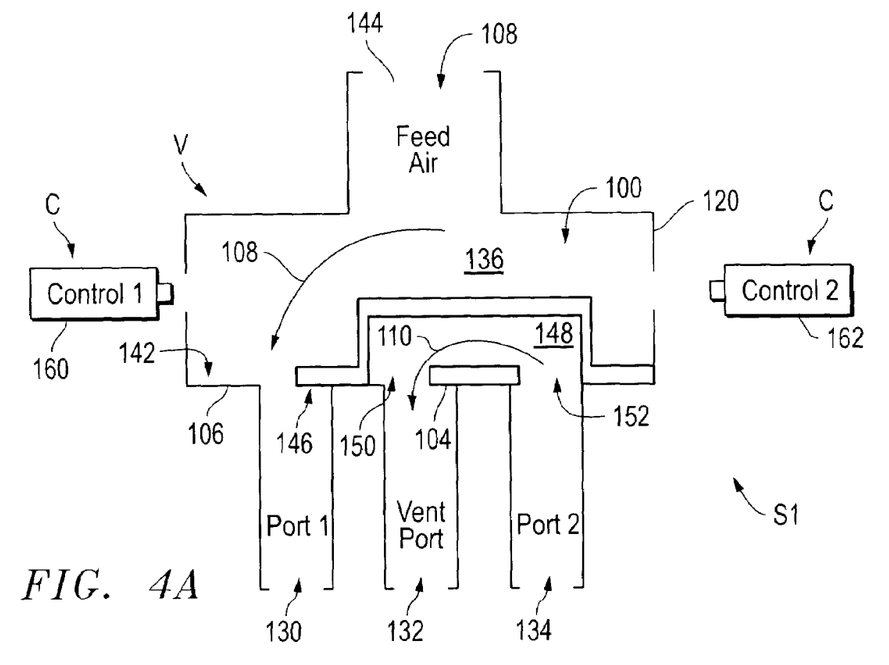
FIGS. 4a through 4e is a series of cross sectional views of the valve of the present invention.
Figure 4B:
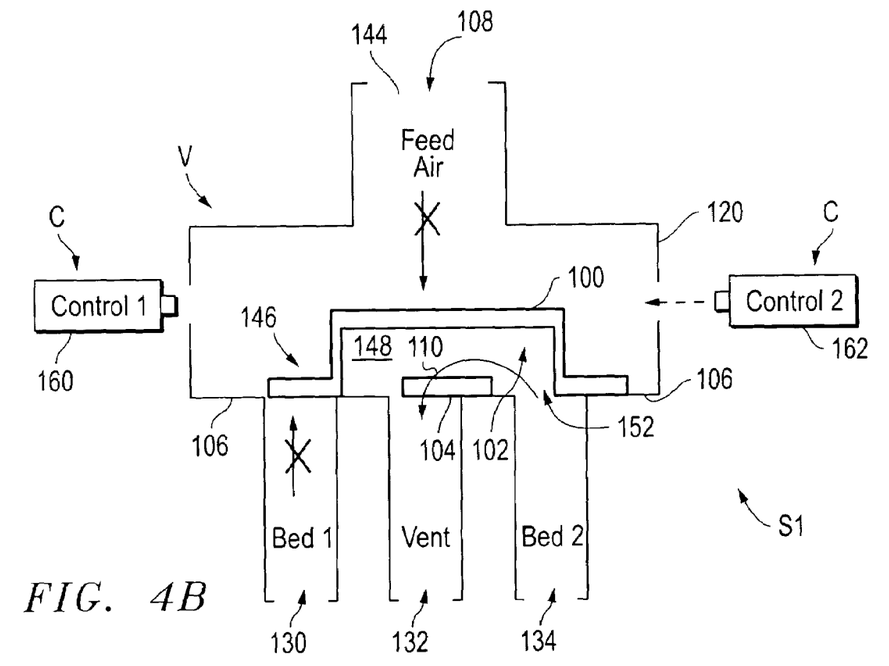

The unique features of the present valve V are as follows. First, the linear slide valve has all of the features of those described in U.S. Pat. No. 6,409,807, but it includes an air conserving feature previously unknown. It has an internal slide block 100 which moves linearly back and forth across a slide plate 106 with three mating ports 130, 132, and 134 The slide plate ports are labeled "port 1," "vent port," and "port 2" sequentially across the plate in the FIGS. 4a–e series. The feed air flow 108 passes through a fourth port labeled "feed air" 144, and depending on the position of the slide block 100, alternately pressurizes either port 1 130 or port 2 134. When port 1 130 is connected to the feed air, port 2 134 is connected to the vent port. 132 by the air or fluid path 110 provided within the interior chamber 148 in the slide block 100. See FIG. 4a.

When the valve changes state, the opposite is true: port 2 134 is connected to the feed air 144, and port 1 130 is connected to the vent port 132 for fluid or gas flow 110. See FIG. 4e.

A slide type valve V for regulating a gas generating system 10 (see FIG. 3) that has at least a first and a second gas concentrating bed unit 12 and 14 respectively includes an outer body 120 with a slide face 106 having at least three open ports 130, 132, and 134 communicating with an interior cavity 136 formed in the outer body 120. The slide face 106 has an exterior surface 140 and an essentially flat interior surface 142. The open ports form a vent port 132 and at least two bed ports 130, 134 each of which is adapted to communicate an air flow with a gas concentrating bed unit 12 or 14. The vent port 132 is formed between two bed ports 130 and 134 A feed air port 144 in the outer body 120 is adapted for communicating feed air 108 into the interior cavity 136 of the outer body 120. A slide block 100 having an essentially flat face 146 suitable for sliding along the interior surface of the slide face 142 of the outer body 120 has a hollow interior cavity 148 and a first and a second opening 150 and 152 respectively formed through the flat face 146 compatible with the open ports of the outer body 120. The slide face 146 of the slide block 100 has a closing portion 104 position between the first and second openings 150 and 152. A controller C moves the slide block between a first state S1 and a second state S2 for desired air flow between the gas concentrating bed units 12, 14 and the vent port 132.

The undercut 102, the two ends of the slide face 146 of the slide block 100, the closing portion 104, and the vents 150 and 152, are formed to, permit fluid flows 108 and 110 in accordance with the following description of FIGS. 4a through 4e.

The present invention has the internal slide block 100, which has an undercut 102 for providing the vent gas path as previously described. In addition to the undercut 102, there is a closing extension feature 104 in the center of the undercut 102 in the same plane as the base 106 of the slide block 100 which when positioned over the vent (middle) port 132 on the linear slide valve V, closes the vent port 132. In addition to the closing feature 104 of the block, the slide plate ports 150, 152 and the slide block undercut 102 are changed from the known art.

The spacing of the ports 150, 152 and the slide face 146 are critically sized and spaced with the undercut 102 of the slide block 100. During operation, the PSA process is allowed to continue as in a typical OBOGS or OBIGGS. In position A, corresponding to state S1 of FIG. 4a, the feed gas or fluid flow 108 comes in the feed gas port 144, and is directed to port 1 130. At the same time, port 2 134 a gas or fluid flow 110, generally a waste by-product, is directed to the vent port 132 through the cavity 148 formed in the slide block 100. When the slide block 100 is commanded to change state through the cooperative action of control 1 160 and control 2 162, the block 100 moves linearly towards position B, corresponding to state S2, as seen in FIG. 4e. There are no fixed positions of the slide block 100, but during the slide block movement, several sub-states occur. At sub-state A1 of FIG. 4b, the block 100 and its sliding face 146 has moved such that block 100 has closed off the feed air-port in relation to both port 1 130 and port 2 134 Also at sub-state A1, the closing feature 104 of the slide block 100 and the undercut 102 has effectively closed the vent port 132 to fluid flow there-through and in relation to both port 1 130 and port 2 134.

Figure 4C:
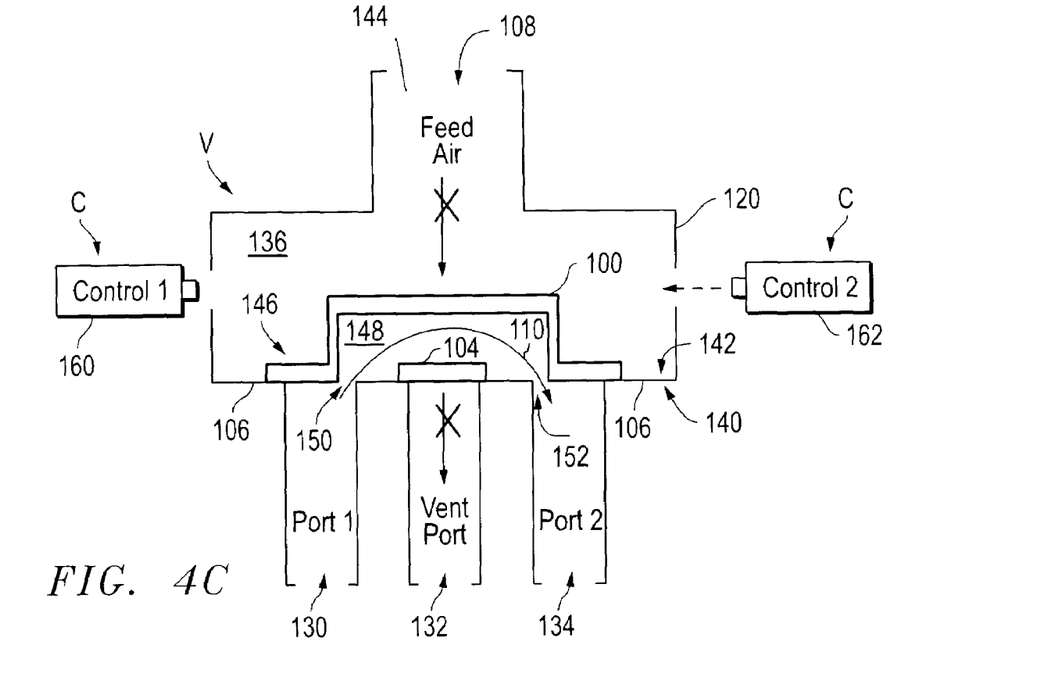

At sub-state A2 in FIG. 4c, the slide block 100 is moved into position such that ports 1 130 and 2 134 are allowed to have fluid or gas flow communication. Fluid flow with Port 1 130 passes through vent 150 into the chamber 148 and through vent 152 into Port 2 134 or vice versa. This gas path 110 allows the waste gas from port 1 130 to pass to port 2 134 through the interior cavity 148 of the sliding block 100. While at the same time the closing feature 104 blocks the passage of gas or fluid into and out of the vent port 132. The feed air flow 108 is blocked from passage into port 1 130, vent port 132, and port 2 134.

Figure 4D:
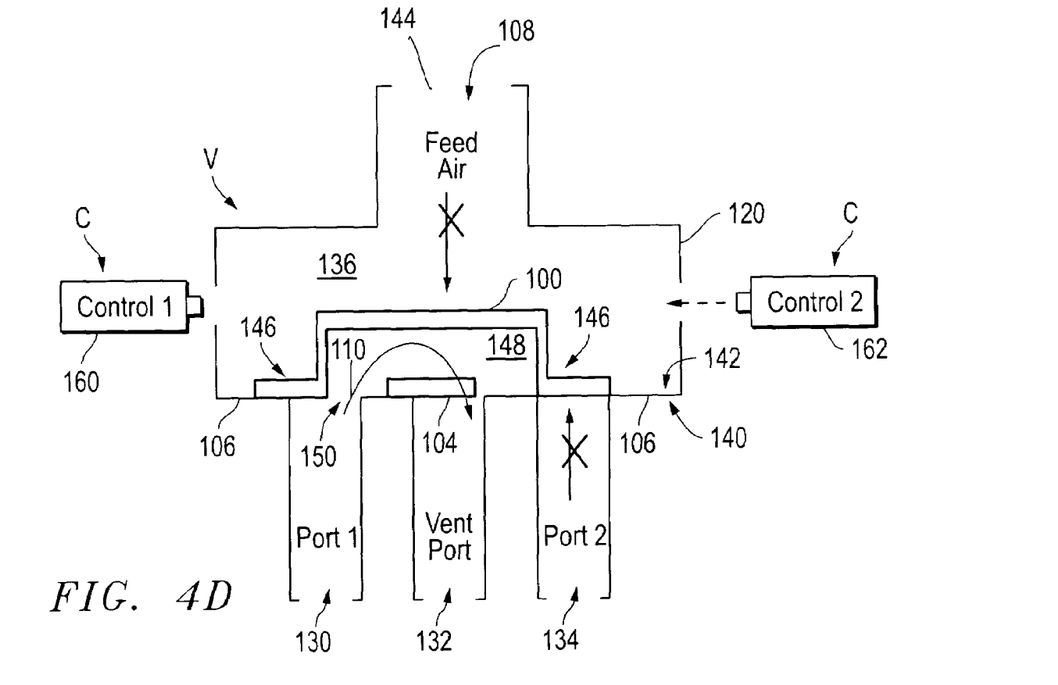
Figure 4E:
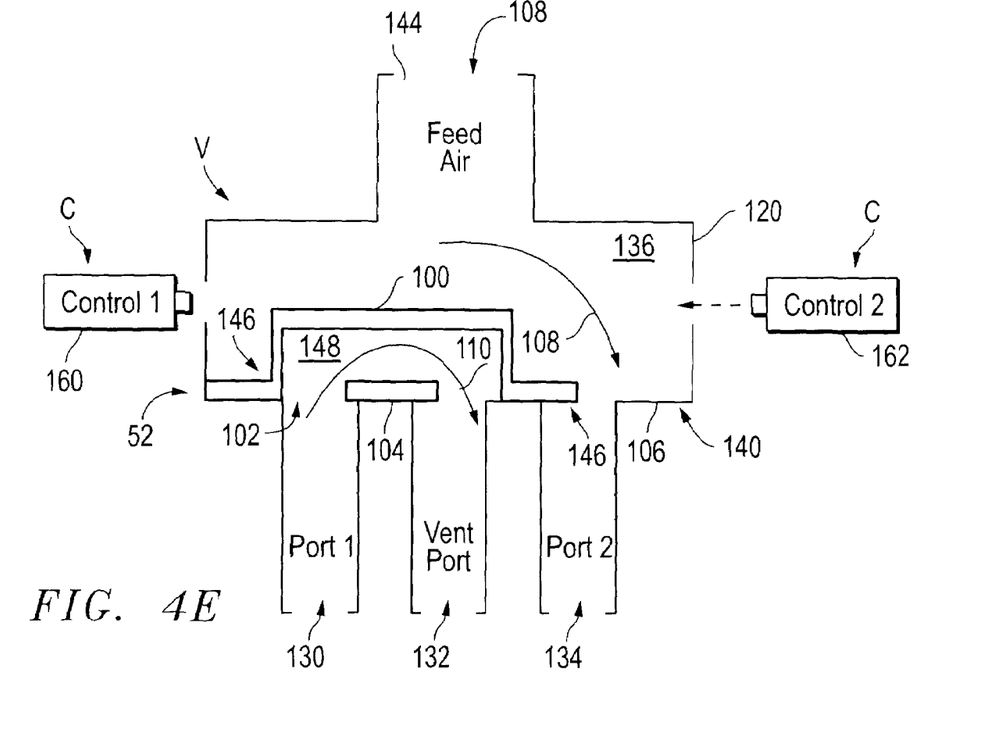
Figure 5:
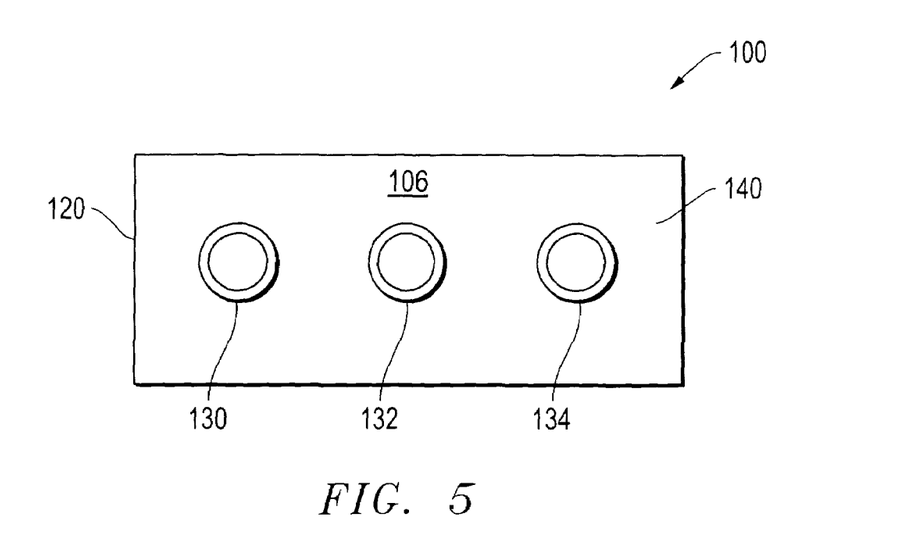
FIG. 5 is a bottom view of one embodiment of the slide valve of the present invention.

When the slide block 100 advances to sub-state A3 of FIG. 4d the vent port 132 is opened for fluid flow to port 1 130 and is closed to port 2 134 and the feed air flow 108. The feed air port 144 is opened to port 2 134 and is closed to port 1 130 and to the feed air flow 108. Port 2 134 is blocked by the sliding surface 146 of the slide block 100 to any fluid flow there-through. Exhaust flow 110 can communicate between the port 1 130 through vent 150 then into the cavity 148 and finally through vent 152 that is partially opened to the vent port 132, and vice versa.

At position B, state S2 of FIG. 4e, the feed gas port 144 is completely open to port 2 134 permitting fluid flow 108 from the feed air port 144 through the interior cavity 136 and into port 2 134. The vent gas port 132 is completely open to port 1 130 permitting fluid to pass from port 1 130 through the cavity or chamber 148 of the slide block 100 to the vent port 132 through the openings 150 and 152 in the slide block 100.

The valve V changes state and the process is reversed, where the waste gas flow 110 from port 2 134 is allowed to pre-pressurize port 1 130 during the transition from position B to position A, or state S2 to state S1.

Control 1 160 and control 2 162 can be solenoids selected for their operational characteristics. Such solenoids would operate in an opposing, but cooperating, manner to move the slide block 100 back and forth. Alternatively, one or more known linear drive motors can function to move the slide block 100 in the controller C, thereby replacing solenoids for control 1 160 and control 2 162.

Compared to a known PSA system using a system of valves, a rotary valve, or a slide valve, the present air conserving slide valve should improve the air efficiency over 15%.

The foregoing disclosure and description of the invention are illustrative and explanatory thereof, and various changes in the size, shape and materials, as well as in the details of the illustrated construction may be made without departing from the spirit of the invention.

The invention claimed is:

1. A slide type valve for regulating a gas generating system having at least a first and a second gas concentrating bed unit, the invention comprising:

an outer body having a slide face with at least four open ports communicating with an interior cavity formed in the outer body; said slide face having an exterior surface and an essentially flat interior surface;

the open ports forming a vent port and at least two bed ports each of which is adapted to communicate an air flow with a gas concentrating bed unit; the vent port formed between two bed ports;

the open ports further forming a feed air port formed in the outer body adapted for communicating a feed air flow into the interior cavity of the outer body;

a slide block having an essentially flat face suitable for sliding along the interior surface of the slide face of the outer body; the slide block having a hollow interior cavity and a first and a second opening formed through the flat face compatible with the open ports of the outer body; and the slide face of the slide block having a closing portion for controllably closing the vent port positioned between the first and second openings; and a control means for moving the slide block between a first state and a second state for desired air flow between the gas concentrating bed units and the vent port.

2. The invention of claim 1 wherein the slide block sealingly abuts against the essentially flat interior surface to minimize undesired airflow out of the interior cavity of the slide block passing between the flat face of the slide block and the flat interior surface of the outer body.

3. The invention of claim 1 wherein the controller further includes a first and an opposing second controller for cooperatively moving the slide block.

4. The invention of claim 3 wherein the first and second controllers are solenoids.

5. The invention of claim 1 wherein the controller further includes a linear drive motor.

6. A control system for controlling a gas generating system including at least a first and a second gas concentrating bed unit, the invention comprising:

a slide valve having an outer body with a slide face formed with at least four open ports communicating with an interior cavity formed in the outer body; said slide face having an exterior surface and an essentially flat interior surface;

the open ports forming a vent port and at least two bed ports each of which is adapted to communicate a fluid flow with a gas concentrating bed unit; the vent port formed between two bed ports;

the open ports further forming a feed air port formed in the outer body adapted for communicating a feed air flow into the interior cavity of the outer body;

a slide block having an essentially flat face adapted for sliding along the interior surface of the slide face of the outer body; the slide block having a hollow interior cavity and a first and a second opening formed through the flat face compatible with the open ports of the outer body; and the slide face of the slide block having a closing portion for controllably closing the vent port positioned between the first and second openings; and a control means for moving the slide block between a first state and a second state for desired air flow between the gas concentrating bed units and the vent port.

7. The invention of claim 6 wherein the slide block sealingly abuts against the essentially flat interior surface to minimize undesired airflow out of the interior cavity of the slide block passing between the flat face of the slide block and the flat interior surface of the outer body.

8. The invention of claim 7 wherein the controller further includes a first and an opposing second controller for cooperatively moving the slide block.

9. The invention of claim 8 wherein the first and second controllers are solenoids.

10. The invention of claim 6 wherein the controller further includes a linear drive motor.

* * * * *